R. F. GARDINER.
APPARATUS FOR THE PRODUCTION OF SYNTHETIC AMMONIA.
APPLICATION FILED MAY 28, 1919.
1,333,404.
Patented Mar. 9, 1920.
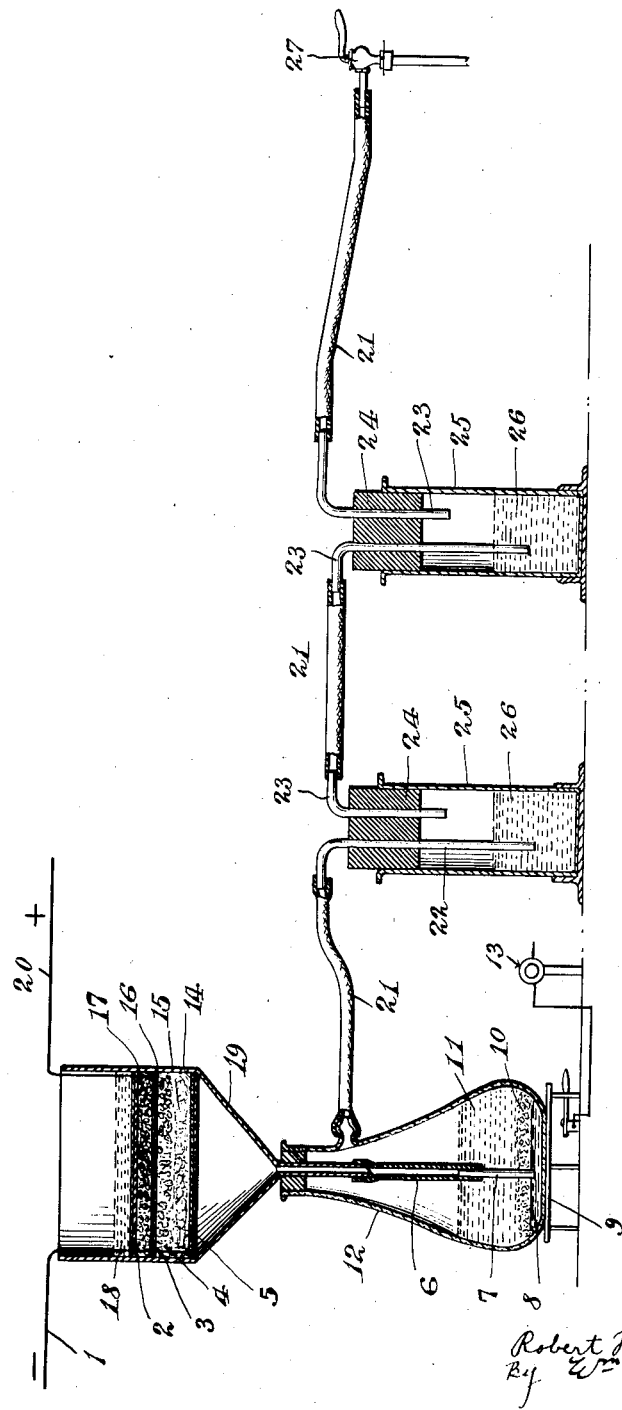
Inventor
Robert F. Gardiner
By Wm. A. Williams
His Attorney.

UNITED STATES PATENT OFFICE.

ROBERT F. GARDINER, OF CLARENDON, VIRGINIA.

APPARATUS FOR THE PRODUCTION OF SYNTHETIC AMMONIA.

1,333,404. Specification of Letters Patent. Patented Mar. 9, 1920.

Application filed May 28, 1919. Serial No. 300,440.

(FILED UNDER THE ACT OF MARCH 3, 1883, 22 STAT. L., 625.)

*To all whom it may concern:*

Be it known that I, ROBERT F. GARDINER, a citizen of the United States, and an employee of the Department of Agriculture, residing at Clarendon, in the county of Alexandria and the State of Virginia, (whose post-office address is Department of Agriculture, Washington, D. C.,) have invented an Apparatus for the Production of Synthetic Ammonia.

This application is made under the act of March 3, 1883, chapter 143 (22 Statutes at Large, page 625), and the invention herein described and claimed may be used by the Government of the United States, or any of its officers or employees, in the prosecution of work for the Government, and any citizen of the United States, without payment to me of any royalty thereon.

My invention consists in the production of synthetic ammonia by passing nitrogen present in the air, or from other sources, through, or in contact with a source of nascent hydrogen. The source of nascent hydrogen used varies from sulfuric and hydrochloric acid solutions acting on zinc, iron, steel, and aluminum, both with and without the electric current, to the action of calcium hydroxid, calcium bicarbonate, sodium hydroxid or sodium bicarbonate on aluminum electrodes, with or without an electric current, and the action of amalgamated aluminum in contact with mercury on water solutions of calcium hydroxid, calcium bicarbonate, sodium hydroxid or sodium bicarbonate.

Reference is to be had to the accompanying drawing forming a part of this specification which shows a vertical section through an electrolytic bath embodying my invention. This device consists of the following: 1, negative lead to negative electrode; 2 and 3, filtros diaphragms; 4, fruit pit charcoal moistened with alkali and water glass; 5, connection to negative aluminum electrode; 6, rubber connections; 7, glass tubing; 8, mercury; 9, electrical hot plate; 10, amalgamated aluminum; 11, alkaline solution; 12, evolution flask; 13, socket and plug; 14, perforated negative aluminum electrode on perforated bottom of Buchner filtering funnel; 15, absorbent cotton; 16, filtros diaphragm same as No. 3, beneath positive electrode; 17, filtros diaphragm same as No. 3, with fruit pit charcoal underneath; 18, air and alkaline solution being sucked into cell and flask; 19, Buchner filtering funnel; 20, positive lead to positive aluminum electrode; 21, rubber connection; 22, glass tubing; 23, glass tubing; 24, rubber stopper; 25, acid absorption apparatus; 26, acid absorption solution; 27, valve controlling air suction.

Diaphragms of filtros are used in a Buchner filtering funnel with packings between the electrodes of fruit pit or gas mask charcoal, cotton, and lime, either with or without sodium silicate. A mixture of gas mask charcoal, lime, and sodium silicate is poured on the upper filtros diaphragm and water added from time to time while suction is applied. It is found that cotton as an absorbent could be eliminated without injury to the process. One filtros diaphragm is placed above the aluminum anode while the other is placed above the aluminum cathode at the bottom of the suction cell near the point where air is sucked out of the cell through nascent hydrogen into the evolution flask in contact with another source of nascent hydrogen.

The purpose for which the packing is used between the electrodes is to absorb the nitrogen from the air, and while this nitrogen is temporarily enmeshed by the cotton it is brought more intimately in contact with the nascent hydrogen evolved from the electrodes, especially the cathode.

The cotton is used to bring together the reacting nitrogen and nascent hydrogen, and for the purpose of bringing the lime with which the cotton is saturated in contact with the electrodes for a longer period of time so that greater economy in the use of the lime used and nascent hydrogen production is brought about.

The sodium silicate assisted in the conductivity of the current through the cell, and at the same time produced a denser medium to pass the nitrogen of the air through, by acting as a binder for the packing taken as a whole.

The end of the Buchner filtering funnel has a piece of rubber tubing attached in which is inserted a piece of glass tubing dipping into a mercury seal in the filtering or evolution flask. The filtering or evolution flask contains mercury and strips of amalgamated aluminum, together with either calcium hydroxid, calcium bicarbonate, sodium hydroxid or sodium bicarbonate.

In the operation of my process calcium hydroxid, calcium bicarbonate, sodium hydroxid, and sodium bicarbonate are used instead of acids.

The manner of carrying out my process cannot be strictly limited to the materials used in construction, for the general design will be wholly unaffected, as well as the objects to be achieved for synthetic ammonia production. The method of procedure for which a novelty is claimed in the carrying out of the process for producing synthetic ammonia is outlined as follows:

Suction instead of pressure is used to draw air through the perforated aluminum electrodes, the electrodes are separated by filtros diaphragms with packing consisting of cotton, fruit pit charcoal, with or without sodium silicate. The cotton can be eliminated without injury to the process. These materials are next saturated in the cell with calcium hydroxid, or calcium bicarbonate, or sodium hydroxid, or sodium bicarbonate solutions, preferably calcium hydroxid on account of cheapness. The aforementioned solutions are sucked through the packed cell into the heated connected flask containing the amalgamated aluminum and mercury, together with any ammonia formed or amido like substances. Mercury is placed in the connected flask to act as a seal, while the purpose of the amalgamated aluminum is to assist in enriching the total yield of ammonia, thus the connected flask would act as an ammonia converter, by means of the nascent hydrogen evolved by the amalgamated aluminum acting on water or a solution of calcium hydroxid, calcium bicarbonate, sodium hydroxid, or sodium bicarbonate. The nascent hydrogen evolved by the amalgamated aluminum would tend to cause a more complete production of ammonia, for it would act on some of the nitrogen that escaped conversion to ammonia, while passing through the packed cell containing the aluminum electrodes. The ammonia produced in the manner described is sucked into and absorbed in acids, preferably sulfuric acid.

The advantages of my invention are:

Synthetic ammonia is produced, under the proper conditions, from air nitrogen, or any other source of nitrogen, such as waste nitrogen from the Linde process.

The air furnishes a practically unlimited nitrogen reservoir.

Steam, such as exhaust steam, can be used to good advantage as a source of heat, for heating the evolution flask or apparatus, and it can at the same time be run into and through the system with the air.

Having thus described my invention, I claim:

An apparatus for the production of synthetic ammonia comprising an electrolytic cell of the suction type, packed with diaphragm of filtros, fruit pit and cotton, saturated with an alkaline solution.

ROBERT F. GARDINER.